United States Patent Office 2,981,723
Patented Apr. 25, 1961

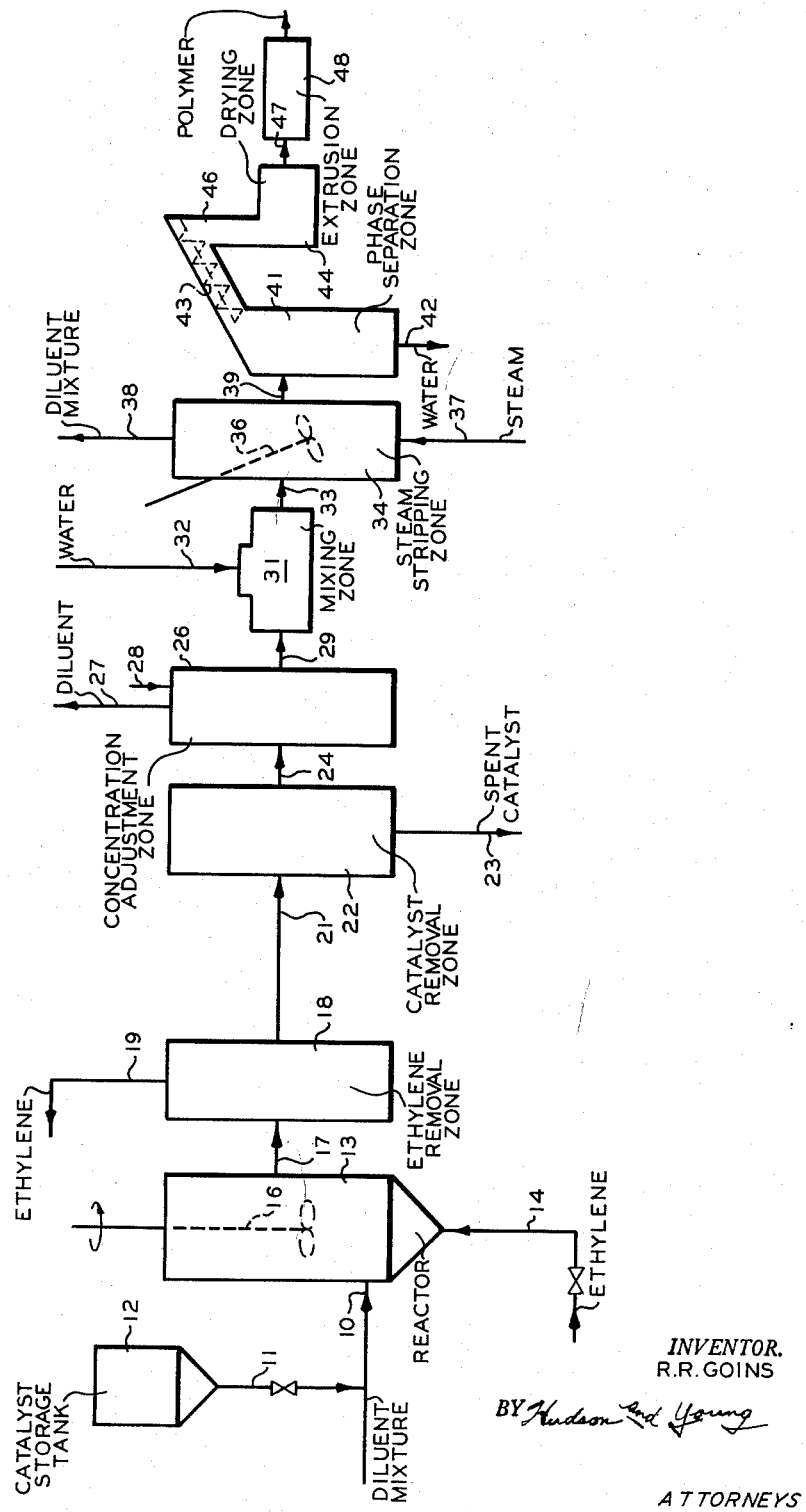

2,981,723

PRODUCTION OF SOLID OLEFIN POLYMERS USING OXIDE CATALYSTS AND MIXTURES OF N-HEXANE AND CYCLOHEXANE AS DILUENTS

Robert R. Goins, Bartlesville, Okla., assignor to Phillips Petroleum Company, a corporation of Delaware Filed Dec. 15, 1958, Ser. No. 780,409

7 Claims. (Cl. 260—88.2)

This invention relates to an improvement in a process for the polymerization of olefins in the presence of a chromium oxide-containing catalyst. In one aspect of the invention, it relates to an improved process for producing in high yields high molecular weight olefin polymers.

It has recently been disclosed by J. P. Hogan and R. L. Banks in U.S. Patent 2,825,721, issued on March 4, 1958, that unique polymers and copolymers can be produced by contacting one or more olefins with a catalyst comprising, as an essential ingredient, chromium oxide, which includes a substantial amount of hexavalent chromium. The chromium oxide is ordinarily associated with at least one other oxide, particularly at least one oxide selected from the group consisting of silica, alumina, zirconia and thoria. The olefin feed used for the polymerization is at least one olefin selected from a class of 1-olefins having a maximum of eight carbon atoms per molecule and no branching nearer the double bond than the 4-position. Examples of olefins which can be polymerized by the described process include ethylene, propylene, 1-butene, 1-pentene, and 1,3-butadiene. Copolymers, such as ethylene-propylene copolymers, and ethylene-butadiene copolymers, can also be prepared by utilizing the chromium oxide-containing catalyst. The temperature for the polymerization reaction is usually in the range of about 100 to about 500° F., with a temperature in the range of 225 to 375° F. being often preferred in the polymerization of ethylene. The instant invention is directed to an improvement in the process disclosed in the Hogan and Banks patent. Thus, it has been discovered that by carrying out the polymerization in the presence of a certain diluent mixture, as described hereinafter, certain unexpected results and advantages are obtained, particularly with regard to the yield of the polymer products.

It is an object of this invention to provide an improved process for the polymerization of polymerizable olefins in the presence of a chromium oxide-containing catalyst.

Another object of the invention is to provide a process whereby high molecular weight, solid olefin polymers can be obtained in high yields in terms of polymer produced per pound of catalyst employed.

A further object of the invention is to provide a process for preparing olefin polymers in which the reaction medium employed in the polymerization can be readily removed from the polymer product.

A still further object of the invention is to provide a process for preparing solid olefin polymers in which catalyst can be separated at high filtration rates from the polymer solution recovered from the polymerization.

Other and further objects and advantages of the invention will become apparent to those skilled in the art upon consideration of the accompanying disclosure.

The instant invention resides in an improved process for polymerizing polymerizable olefins in the presence of a chromium oxide-containing catalyst. Broadly speaking, the process comprises the step of contacting a polymerizable olefin with a suspension of a chromium oxide-containing catalyst in a liquid hydrocarbon mixture of normal hexane and cyclohexane. It has been discovered that when the polymerization is conducted in the presence of such a diluent mixture, the productivity of the catalyst is unexpectedly increased. Furthermore, when utilizing the diluent mixture of this invention as the reaction medium, improved catalyst filtration rates are obtained when catalyst is subsequently separated from the polymer solution. When preparing copolymers, e.g., copolymers of ethylene and propylene or ethylene and butene-1, it has also been found that utilization of the diluent mixture greatly facilitates separation of the diluent from the polymer. Still other advantages accrue from the use of the specific diluent mixture of this invention as will become apparent from the following description.

The diluent mixture referred to hereinabove functions as an inert dispersant and heat transfer medium in the practice of the polymerization process. The mixture of normal hexane and cyclohexane is a solvent for the olefin feed and the polymer formed in the process at the temperature at which the polymerization is conducted. The cyclohexane constitutes at least 15 weight percent of the total diluent mixture, the remainder of the mixture being normal hexane. The diluent mixture preferably contains from 15 to 85 weight percent cyclohexane and from 85 to 15 weight percent normal hexane. A particularly desirable diluent mixture has been determined to be one containing approximately 25 weight percent cyclohexane and 75 weight percent normal hexane. Although small amounts of other paraffins can be tolerated in the diluent mixture, the individual fractions used to make up the mixture are preferably of a high purity, e.g., 90 percent and higher.

The catalyst utilized in the process of this invention comprises, as an essential ingredient, chromium oxide, preferably including a substantial amount of hexavalent chromium. The chromium oxide is usually associated with at least one other oxide, particularly at least one oxide selected from the group consisting of silica, alumina, zirconia and thoria.

The chromium oxide content of the catalyst can range from 0.1 to 10 or more weight percent, e.g., up to about 50 percent or higher, usually 50 percent or less, but the preferred range is from 2 to 6 weight percent, expressed as elemental chromium. A preferred non-chromium component is a silica-alumina composite containing a major proportion of silica and a minor proportion of alumina. While the method of preparing the silica-alumina composite undoubtedly affects to some extent the catalyst activity, it appears that composites prepared by any of the prior art processes for preparing such catalytically active composites, e.g., coprecipitation and impregnation, are operative for the process of this invention. Methods for the preparation and the activation of this catalyst are described in detail in the Hogan and Banks patent referred to hereinbefore. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitible to chromium oxide. Examples of such compounds are chromium trioxide, chromium nitrate, chromium acetate and ammonium chromate. The composite resulting from the impregnation step is dried and then contacted for a period of several hours at a temperature of from about 450 to 1500° F., preferably from about 900 to about 1000° F., under non-reducing conditions, for example, with a stream of substantially anhydrous (dew point preferably 0° F. or lower) oxygen-containing gas, such as air. A commercial microspheroidal silica-alumina composite can also be advantageously used in the preparation of the catalyst.

The catalyst as employed in the present process is in the form of a relatively fine powder so that it may be easily maintained in suspension as a slurry in the liquid hydrocarbon mixture. The catalyst powder generally has a particle size of 100 mesh and smaller, preferably 100 microns and smaller. While the catalyst size is not critical, it should be small enough so that it can be readily maintained as a slurry in the liquid hydrocarbon mixture.

The concentration of the catalyst in the reaction zone can vary within rather wide limits, and the actual concentration will depend to a great degree upon practical considerations. In general, the concentration of catalyst in the reaction zone is usually in the range of 0.005 to 5 weight percent, preferably 0.01 to 1.0 weight percent, based upon the total amount of diluent mixture present in the reaction zone. The residence or contact time used in practicing the present process can vary widely for any given set of operating conditions. However, the contact time for any particular set of operating conditions should not be so long as to allow an excessive concentration of polymer to build up in the reaction zone. It can be stated that the contact time will generally be in the range of 0.1 to 12 hours, preferably from 1 to 5 hours.

The temperature at which the polymerization reaction is carried out is usually in the range of about 100 to about 500° F. It is usually preferred to operate at a temperature in the range of 225 to 375° F. When carrying out the polymerization in the presence of the diluent mixture of this invention, it has been found that somewhat higher reaction temperatures, e.g., about 10° F. higher, are required to obtain a polymer product comparable to the polymer obtained when employing a single diluent such as cyclohexane. The term "comparable" polymers is intended to describe polymers having similar melt indices. The pressure in the polymerization zone need only be sufficient to maintain the liquid hydrocarbon mixture substantially in the liquid phase. This pressure ordinarily ranges from about 100 to about 700 p.s.i. However, it is to be understood that higher and lower pressures can be employed without departing from the spirit or scope of the invention.

A more complete understanding of the invention can be obtained by referring to the accompanying drawing which is a flow diagram illustrating a preferred embodiment of the invention. While the invention will be discussed with relation to the polymerization of ethylene using a mixture of cyclohexane and normal hexane as the reaction medium or diluent, it is to be understood that the invention is broadly applicable to the polymerization of at least one polymerizable olefin. The present invention is particularly applicable to the polymerization of aliphatic 1-olefins, especially those containing 2 to 8 carbon atoms per molecule and having no branching nearer the double bond than the 4-position. Examples of preferred 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-heptene, 4-ethyl-1-hexene, butadiene, isoprene, and the like. Mixtures of the 1-olefins can also be polymerized in accordance with this invention in order to prepare copolymers, such as copolymers of ethylene and propylene, ethylene and 1-butene, and the like.

As shown in the drawing, a diluent mixture containing, for example, 25 weight percent cyclohexane and 75 percent normal hexane, enters the system through inlet line 10. A catalyst, which preferably has a particle size of 100 microns or smaller, is added to the diluent mixture by means of line 11 connecting catalyst storage tank 12 to line 10. The slurry of catalyst in the diluent mixture which is thus formed is then pumped into reactor 13. The catalyst can be, for example, a chromium oxide-silica-alumina catalyst prepared by impregnating a 90 weight percent silica and 10 weight percent alumina gel composite with chromium trioxide, drying, and heating in air to obtain a catalyst composition containing approximately 2.0 weight percent chromium in the form of chromium oxide of which approximately half is in the form of hexavalent chromium.

Ethylene enters the system through inlet line 14 and is intimately contacted with the catalyst suspension or slurry in reactor 13. A suitable stirring means 16, driven by a motor (not shown), is provided to facilitate contacting and to maintain the catalyst in suspension in the reaction mixture. The reaction zone is maintained at a temperature in the range of 225 to 375° F. while the pressure in reactor 13 is such that the diluent mixture is maintained substantially in the liquid phase. Although there is nothing critical about the reaction pressure other than it be sufficient to maintain the reaction medium in the liquid phase, the pressure is generally in the range of 100 to 700 p.s.i. When carrying out the polymerization with the diluent mixture of this invention, it has been found that very high catalyst productivity rates can be obtained. For example, in the case of the production of polyethylene, yields as high as 1250 pounds and higher of polymer per pound of catalyst can be obtained. Correspondingly high yields are obtainable when employing other monomers in the process.

The reactor effluent which is withdrawn from reactor 13 through line 17 comprises a polymer solution containing catalyst and small amounts of unreacted ethylene. The reactor effluent is passed into ethylene removal zone 18 wherein unreacted ethylene is vaporized and then taken overhead through line 19. This material can then be recycled to polymerization reactor 13. The polymer solution is withdrawn from the ethylene removal zone through line 21 and then introduced into catalyst removal zone 22.

In the catalyst removal zone, the polymer solution is treated so as to remove substantially all of the catalyst from the solution. In one treating method, as described in more detail in U.S. patent application Serial No. 606,427, filed on August 27, 1957, the polymer solution is passed through a batch leaf filter and a disc filter which are operated in series. In such a filtration system, it has been found that much higher filtration rate-throughput factors (gallons/hour/square foot × gallons/square foot) are obtained when the feed is a polymer solution containing cyclohexane and normal hexane as the liquid hydrocarbons. For example, in a filtration run with a polymer solution containing polyethylene having a melt index of 0.2 dissolved in a mixture of cyclohexane and normal hexane, a filtration rate-throughput factor of 290 gallons$^2$/hour/ft.$^4$ was obtained. When filtering a solution of a similar polymer in cyclohexane, a rate-throughput factor of about 240 gallons$^2$/hour/ft.$^4$ is usually obtained. During the filtration of a polymer solution containing a copolymer having a melt index of 0.4 and a density of 0.935, which had been produced in the presence of the diluent mixture of this invention, a rate-throughput factor of 300 gallons$^2$/hour/ft.$^4$ was obtained. With a similar copolymer produced in the presence of cyclohexane, a rate-throughput factor of about 150 gallons$^2$/hour/ft.$^4$ is normally obtained. It is thus seen that better filter performance results when polymer solutions obtained from the present polymerization are filtered than when polymer solutions obtained from a polymerization using a single diluent, such as cyclohexane, are employed. Although it is generally preferred to employ two filters operated in series as hereinbefore mentioned, other means for separating catalyst from the polymer solution can be utilized. For example, a series of centrifuges can be employed as described in copending U.S. patent application Serial No. 606,140, filed August 24, 1956, now Patent No. 2,914,518, by J. E. Cottle. Line 23 connected to catalyst removal zone 22 provides means for removing spent catalyst from that zone. The polymer solution substantially free of catalyst is removed from the catalyst removal zone through line 24.

Upon removal from zone 22, the polymer solution is passed into concentration adjustment zone 26 wherein the concentration of the polymer solution is adjusted. The concentration of polyethylene in the diluent mixture is usually low, and solvent is removed from zone 26 through line 27. However, if the concentration is high, diluent can be added to zone 26 through line 28. The solution in zone 26 is cooled, e.g., to about 240° F., either by evaporation of diluent or by the addition of cool diluent to that zone. The polymer solution is usually adjusted so that the concentration of polymer therein is in the range of 1 to 8 weight percent, preferably from 2 to 5 weight percent. However, it is to be understood that it is not intended to limit the invention to the treatment of a polymer solution of any particular concentration.

The polymer solution of a desired concentration is withdrawn from concentration adjustment zone 26 through line 27. The polymer solution is then passed into mixing T 31 wherein it is mixed with, for example, 1 to 5 volumes of cool water which is introduced into the T through line 32. The mixture of polymer, liquid hydrocarbons and water remains in zone 31 for a sufficient time to cause precipitation of substantially all of the polymer. The residence time in the zone is dependent upon the final temperature of the mixture, but it should be sufficient to allow the polymer to completely harden. Thereafter, the resulting dispersion is passed into steam stripping zone 34 wherein the liquid hydrocarbons are separated from the precipitated polymer and water. The stripping zone is preferably operated at about atmospheric pressure and at about 170° F., although higher and lower pressures and temperatures can be utilized. In order to avoid agglomeration of the granular polymer, it is important that the polymer in the stripping zone not be in a sticky or tacky condition. When preparing polymers having a specific gravity of about .955 and below, for example, ethylene-butene-1 copolymers, in the presence of cyclohexane as the sole diluent, it is necessary to operate the steam stripper under a vacuum, e.g., 7.5 p.s.i.a., in order that the stripping operation may be carried out at temperatures, e.g., about 140° F., at which the polymer is not tacky or sticky. However, when employing the mixed diluent of this invention, it has been found that the granular copolymer is not sticky at the higher temperature. As a result, the stripping zone can be operated at atmospheric pressure, thereby eliminating the necessity of maintaining a vacuum on the stripping zone. Steam stripping zone 34 is provided with a stirrer 36 in order to maintain the solids in dispersion. Although any conventional means can be used to supply heat to the stripping zone, it is usually preferred to employ steam. Steam is supplied to the stripping zone through line 37, and diluent mixture is recovered through line 38. The stream withdrawn through line 38 contains steam and hydrocarbon vapors which can be condensed and thereafter separated in any suitable equipment. After drying, the diluent mixture so separated can then be employed in the polymerization process. Reference may be had to copending U.S. patent application Serial No. 712,908, filed on February 3, 1958, by R. G. Wallace for a more complete description of the above-described method for recovering polymers from hydrocarbon solutions. Although this polymer recovery method is particularly suitable for use in recovering the polymer produced in the present polymerization process, it is to be understood that any suitable polymer recovery method can be used in the practice of the present invention.

A slurry of polymer in water is withdrawn from steam stripping zone 34 through line 39. This slurry is then passed into phase separation zone 41 wherein the solid polymer is separated from the water. Water is withdrawn from zone 41 through line 42 while the solid polymer, which floats to the surface, is removed from the zone by any suitable means, such as auger 43. The polymer so removed from zone 41 is passed into drying zone 44 through conduit 46. The dried polymer is removed from the drying zone through conduit 47 and then passed into extrusion zone 48. The polymer which is recovered from the extrusion zone, usually in the form of strands, is then cooled after which it may be chopped into smaller pieces and sent to storage or otherwise processed as desired.

A more comprehensive understanding of the invention can be obtained by referring to the following illustrative example which is not intended, however, to be unduly limitative of the invention.

EXAMPLE

Several polymerization runs were carried out according to the present invention, utilizing a 60 gallon, stirred reactor. Several control runs were also carried out in order to demonstrate the unexpected results obtained when proceeding in accordance with the present invention.

The runs were all carried out in a continuous manner, employing a catalyst containing 2.5 weight percent chromium oxide, calculated as chromium. The catalyst, which was supported on a silica-alumina base, was activated by passing air through a heated fluidized bed of catalyst particles until the dew point of the effluent air from the activation zone had dropped to 0° F. The polymerization runs according to the present invention, were carried out in the presence of a diluent mixture containing 75 weight percent normal hexane and 25 weight percent cyclohexane. In the control runs, cyclohexane was used as the sole polymerization diluent. The operating conditions for the several runs and the results obtained in the runs are shown hereinbelow in Table I. Analyses of the normal hexane and the cyclohexane employed in the runs are shown in Table II.

Table I

| Run No. | ᶠ1 | 2 | ᶠ3 | 4 | ᶠ5 | 6 |
|---|---|---|---|---|---|---|
| Catalyst Activation Temperature, °F | 1,012 | 1,000 | 1,030 | 1,010 | 1,000 | 1,012 |
| Ethylene Feed Rate, lb./hr | 23.0 | 20.0 | 24.0 | 28.0 | 23.5 | 29.0 |
| Butene Feed Rate, lb./hr | | | ᶜ 2.0 | ᵇ 1.5 | ᵃ 14.0 | ᵇ 13.0 |
| Ethylene-Butene Ratio in Feed | | | 93/7 | 95/5 | 70/30 | 70/30 |
| Solvent Feed Rate, lb./hr.: | | | | | | |
| Cyclohexane ᵈ | 173 | | 173 | | 160 | |
| Mixed solvent ᵉ | | 145 | | 190 | | 200 |
| Solvent Feed Temperature, °F | 212 | 210 | 200 | 195 | 78 | 70 |
| Reactor Temperature, °F | 283 | 266 | 271 | 265 | 248 | 243 |
| Reactor Pressure, p.s.i.g | 420 | 420 | 420 | 420 | 420 | 420 |
| Reactor Residence Time, hours | 1.9 | 2.0 | 1.9 | 1.5 | 2.1 | 1.5 |
| Polymer Concentration in Reactor, wt. percent | 7.1 | 7.1 | 7.3 | 7.5 | 6.7 | 7.3 |
| Catalyst Concentration in Reactor, wt. percent | 0.012 | 0.0057 | 0.010 | 0.0060 | 0.042 | 0.0080 |
| Catalyst Productivity, lb. polymer/lb. catalyst | 587 | 1,250 | 713 | 1,250 | 160 | 909 |
| Specific Gravity ᵍ | 0.962 | (ⁱ) | 0.949 | 0.953 | 0.940 | 0.935 |
| Polymer Melt Index ʰ | 0.36 | 0.19 | 0.74 | 0.55 | 0.91 | 0.57 |

ᵃ 72 percent Butene-1.
ᵇ 97 percent Butene-1.
ᶜ 94 percent Butene-1.
ᵈ Composition shown in Table II.
ᵉ 75 weight percent n-hexane, 25 weight percent cyclohexane; compositions are shown in Table II.
ᶠ Control runs.
ᵍ For specific gravity determination a sample is prepared by compression molding of the polymer at a temperature of 320° F. and a pressure of 10,000–15,000 lbs/square inch in a Pasadena Hydraulic Press. The sample is maintained at about 320° F. until it is completely molten. It is then cooled from 320 to 250° F. at the rate of approximately 14° F. per minute. The sample was permitted to cool to below 150° F. before being removed from the press. The resulting sample is approximately 3 x 3 x 1/16 inches. A small piece of this sample is cut and inspected to insure that it is free of voids. The small sample is placed in a sample receiver of a Westphal balance. Carbon tetrachloride and methylcyclohexane are then introduced into the receiver in such proportions that the sample is suspended in the mixed solution, i.e., it neither floats nor sinks. After the liquids have been so proportioned that the polymer is suspended therein without sinking or floating at a temperature of 20° C., the density of the liquid mixture is equal to the density of the solid polymer. The polymer sample is then removed from the liquid and the specific gravity of liquid is measured on the Westphal balance at a temperature of 20° C. This specific gravity is equal to specific gravity of the polymer. For most practical purposes, the specific gravity can be considered identical to the density. However, if a precise conversion to actual density units (grams per cc.) is desired, this is readily referable to water at 4° F. by calculations which are readily evident to those skilled in the art. The precision of a single specific gravity determination is ordinarily within ±0.0002.
ʰ Determined according to method of ASTM D–1238–52T except for the following modification. The polymer sample was allowed to extrude from the test apparatus until no air bubbles were observed in the extrudate. A stop watch was then started and the extrudate was cut off with a spatula at the end of 9 and 11 minutes. The 9 to 11 minute cut was weighed. This weight was multiplied by 5 and reported as the melt index value.
ⁱ Not determined.

Table II

| | Normal Hexane | Cyclohexane |
|---|---|---|
| 2-Methylpentane | 0.6 | |
| 3-Methylpentane | 5.7 | |
| Normal hexane | 85.1 | |
| Methylcyclopentane | 6.5 | |
| 2,2-Dimethylpentane | 0.7 | 2.4 |
| Benzene | 0.4 | |
| 2,4-Dimethylpentane | 0.8 | 5.1 |
| Cyclohexane | 0.4 | 91.1 |
| 1,1-Dimethylcyclopentane | | 0.9 |
| 2,3-Dimethylpentane | | 0.1 |
| 2-Methylhexane | | 0.4 |
| | 100.2 | 100.0 |

From a consideration of the data shown in Table I, it is seen that the productivity of the catalyst when using a diluent mixture was at least double the productivity when cyclohexane was employed as the sole diluent.

From the foregoing, it is apparent that in accordance with the present invention, an improvement in the polymerization of olefins has been provided whereby high molecular weight, solid polymers can be obtained in very high yields in terms of polymer produced per pound of catalyst used. The polymers so produced have utility in applications where plastic materials generally are utilized. They can be molded or extruded to form containers and pipe or flexible tubing, or they can be used as insulation or as lining for tanks to mention only a few applications.

It will be apparent to those skilled in the art that variations and modifications of the invention can be made in the light of the foregoing disclosure. Such variations and modifications are believed to be clearly within the spirit and scope of the invention.

I claim:

1. In a process for producing solid olefin polymers which comprises polymerizing at least one aliphatic 1-olefin containing 2 to 8 carbon atoms per molecule and having no branching nearer the double bond than the 4-position in the presence of a catalyst comprising chromium oxide, including hexavalent chromium, and at least one oxide selected from the group consisting of silica, alumina, thoria and zirconia, the improvement which comprises carrying out the polymerization in the presence of a mixture consisting essentially of normal hexane and cyclohexane at a temperature in the range of 225 to 375° F. and at a pressure sufficient to maintain said mixture in the liquid phase, said mixture containing from 15 to 85 weight percent cyclohexane and from 85 to 15 weight percent normal hexane.

2. In a process for producing solid olefin polymers which comprises polymerizing at least one aliphatic 1-olefin containing 2 to 8 carbon atoms per molecule and having no branching nearer the double bond than the 4-position in the presence of a catalyst comprising chromium oxide, including hexavalent chromium, and at least one oxide selected from the group consisting of silica, alumina, thoria and zirconia, the improvement which comprises carrying out the polymerization with said catalyst in suspension in a mixture consisting essentially of normal hexane and cyclohexane at a temperature in the range of 225 to 375° F. and at a pressure sufficient to maintain said mixture in the liquid phase, said mixture containing from 15 to 85 weight percent cyclohexane and from 85 to 15 weight percent normal hexane.

3. A process according to claim 2 wherein ethylene is polymerized in the presence of said catalyst.

4. A process according to claim 2 wherein propylene is polymerized in the presence of said catalyst.

5. A process according to claim 2 wherein a mixture of ethylene and propylene is polymerized in the presence of said catalyst.

6. A process according to claim 2 wherein a mixture of ethylene and 1-butene is polymerized in the presence of said catalyst.

7. In a process for polymerizing at least one aliphatic 1-olefin having from 2 to 8 carbon atoms per molecule and no branching nearer the double bond than the 4-position by contacting same with a catalyst comprising chromium oxide, including hexavalent chromium, and at least one oxide selected from the group consisting of silica, alumina, thoria, and zirconia, the improvement which comprises carrying out the polymerization with said catalyst in suspension in a diluent mixture consisting essentially of normal hexane and cyclohexane at a temperature in the range of 225 to 375° F. and at a pressure sufficient to maintain said mixture in the liquid phase, said diluent mixture containing from 15 to 85 weight percent cyclohexane and from 85 to 15 weight percent normal hexane; and recovering a resulting solid polymer.

References Cited in the file of this patent

UNITED STATES PATENTS

| | | |
|---|---|---|
| 2,731,453 | Field et al. | Jan. 17, 1956 |
| 2,825,721 | Hogan et al. | Mar. 4, 1958 |
| 2,849,429 | Cines | Aug. 26, 1958 |